(12) United States Patent
Inaba

(10) Patent No.: US 9,185,399 B2
(45) Date of Patent: Nov. 10, 2015

(54) STEREOSCOPIC VIDEO RECEIVER

(71) Applicant: Minoru Inaba, Oyama (JP)

(72) Inventor: Minoru Inaba, Oyama (JP)

( * ) Notice: Subject to any disclaimer, the term of this patent is extended or adjusted under 35 U.S.C. 154(b) by 273 days.

(21) Appl. No.: 13/742,595

(22) Filed: Jan. 16, 2013

(65) Prior Publication Data

US 2014/0063205 A1   Mar. 6, 2014

(30) Foreign Application Priority Data

Aug. 28, 2012 (JP) ................................ 2012-187128

(51) Int. Cl.
*H04N 13/04* (2006.01)
*H04N 13/02* (2006.01)
*H04N 13/00* (2006.01)

(52) U.S. Cl.
CPC ....... *H04N 13/0445* (2013.01); *H04N 13/0029* (2013.01); *H04N 13/04* (2013.01); *H04N 13/0022* (2013.01); *H04N 13/0438* (2013.01)

(58) Field of Classification Search
CPC .......... H04N 13/0203; H04N 13/0221; H04N 13/0246
USPC ................................. 348/42, 47, 51
See application file for complete search history.

(56) References Cited

U.S. PATENT DOCUMENTS

| 5,119,189 | A | 6/1992 | Iwamoto et al. | 358/88 |
| 2010/0134602 | A1 * | 6/2010 | Inaba | 348/58 |
| 2011/0298900 | A1 | 12/2011 | Inaba | 348/47 |
| 2012/0257024 | A1 | 10/2012 | Inaba | 348/49 |

FOREIGN PATENT DOCUMENTS

| JP | 03-119890 | 5/1991 |
| JP | 05-288532 | 11/1993 |
| JP | 2001-147401 | 5/2001 |
| JP | 2006-184434 | 7/2006 |
| JP | 2009-017207 | 1/2009 |
| WO | WO 2010082365 A1 * | 7/2010 |

* cited by examiner

*Primary Examiner* — Sath V Perungavoor
*Assistant Examiner* — Clifford Hilaire
(74) *Attorney, Agent, or Firm* — Fattibene and Fattibene LLC; Paul A. Fattibene

(57) ABSTRACT

To provide a stereoscopic video receiver that generates a stereoscopic video with a sense of stereoscopy and a powerful impression even when a left-eye screen and a right-eye screen are displayed on a small-sized display, a left-eye screen and a right-eye screen shot by a stereo camera to be displayed on a display having a width narrower than that of a virtual display are displayed so as to be displaced in a direction of separating these screens away from each other, and left and right fields of vision are matched with each other at a position away from the display and a distance between left and right corresponding points of an infinite distance subject image is set to be shorter than an interpupillary distance of a viewer.

3 Claims, 6 Drawing Sheets

STEREOSCOPIC VIDEO RECEIVER

TECHNICAL FIELD

The present invention relates to a stereoscopic video receiver for displaying a screen shot and recorded by a stereoscopic camera to reproduce stereoscopic video.

BACKGROUND ART

As a conventional technology of this type, a stereoscopic video receiver has been known in which a left-eye screen and a right-eye screen shot by a stereo camera are displayed on a small-sized display to form a stereoscopic video, the stereoscopic video is generated so that it can be viewed so as to have a size equivalent to the size of a video displayed on a large-sized display (for example, refer to Japanese Unexamined Patent Application Publication No. 2009-17207).

In the stereoscopic video receiver described above, the stereoscopic video is present on a virtual display D0 as depicted in FIG. 5, and is formed by separately viewing the left-eye screen and the right-eye screen displayed on a display of a television, a personal computer, or the like having a width dimension shorter than that of the virtual display D0 by using left and right eyes. A distance between a left image and a right image of an infinite distance subject image, that is, a distance between left and right corresponding points of the infinite distance subject image, is adjusted so as to have a distance equal to a distance between left and right pupils of a viewer, that is, an interpupillary distance.

When the left-eye screen and the right-eye screen displayed on the display are viewed, it is normally desired to view the screens a distance (a recommended viewing distance Dr) thirty times to fifty times as long as an interpupillary distance BS of a viewer away from the virtual display D0. In particular, when moving pictures are viewed, it is desired to set the distance forty times as long as the interpupillary distance BS of the viewer. For example, an average value of interpupillary distances BS (58 mm to 72 mm) of viewers is set at approximately 65 mm, the recommended viewing distance is approximately 2500 mm. Also, while a screen width W0 of the virtual display D0 can be freely set to some extent, if the screen width W0 is extremely narrow, a powerful impression at the time of viewing is lost, and therefore a screen width on the order of 1800 mm is required.

When the screen video on the virtual display D0 as depicted in FIG. 5 is displayed on a display D1 formed with a width dimension W1 narrower than that of the virtual display W0 as depicted in FIG. 6, the width dimensions of a left-eye screen DL and a right-eye screen DR are reduced according to a ratio in width dimension between the display D1 and the virtual display D0, and therefore a distance J between left and right corresponding points PL and PR of an infinite distance subject image P is also reduced. For example, when the virtual display D0 having a width of 1800 mm is represented by the display D1 having a width of 345 mm, if the interpupillary distance BS of the viewer is set at 58 mm, the distance J between the left and right corresponding points PL and PR of the infinite distance subject image P is 345/1800×58=11.12 mm, which is shorter than the lower limit of the interpupillary distance BS of a general viewer, that is, 58 mm.

An observation distance L of the display D1 as depicted in FIG. 6 is 2500×345/1800=approximately 479 mm. When a viewer having an interpupillary distance of 58 mm tries to view the infinite distance subject image P via this display D1, a depth N of the stereoscopic video is merely 479/((58/11.12)−1)=113.5 mm on the display D1 of 15.5 inches. That is, the depth is merely 113.5 mm away from the display D1 even for a furthest subject, other subjects are viewed toward the front, and therefore only a stereoscopic video with a less sense of stereoscopy may be disadvantageously obtained.

In the display disclosed in the patent gazette described above, to mitigate this problem and provide a sense of stereoscopy to the stereoscopic video, the left-eye screen and the right-eye screen are displayed so as to be significantly displaced in a direction of separating these screens away from each other in the display having a limited width dimension to enlarge the distance between the left and right corresponding points of the infinite distance subject image so that this distance is equal to the interpupillary distance of the viewer. With this, the left-eye screen and the right-eye screen are superposed on each other with respect to the width dimension of the display to decrease an area where the screens are to be actually displayed. This may disadvantageously deprive the stereoscopic video of a powerful impression.

To address the problem, there is a need to develop a stereoscopic video with a sense of stereoscopy and a powerful impression even when the left-eye screen and the right-eye screen are displayed on a small-sized display. An object of the present invention is to solve this problem.

SUMMARY OF INVENTION

The present invention is suggested to achieve the object described above, and an aspect of the present invention provides a stereoscopic video receiver of a binocular stereoscopic type in which a left-eye screen and a right-eye screen shot by a stereo camera are displayed on a display and are viewed by left an right eyes in a separated manner to form a stereoscopic video, wherein the display is formed so as to be narrower in width than a virtual display having a reference width dimension and alternately displays the left-eye screen and the right-eye screen that configure the stereoscopic video in a time-division manner, the left-eye screen has a black non-display portion at a right end in a screen width direction, the right-eye screen has a black non-display portion at a left end in the screen width direction, and with the left-eye screen and the right-eye screen being displayed so as to be displaced in a direction of being separated away from each other, left and right fields of vision are matched with each other at a position away from the display and a distance between left and right corresponding points of an infinite distance subject image is set to be shorter than an interpupillary distance of a viewer.

According to this structure, a left-eye screen and a right-eye screen shot by a stereo camera are displayed as being reduced on a display of a television, a personal computer, or the like having a width dimension shorter than that of the virtual display. With this, even if the distance between the left and right corresponding points of the infinite distance subject image on the left-eye screen and the right-eye screen tends to be extremely narrower than the interpupillary distance of the viewer, the left-eye screen and the right-eye screen to be displayed on the display are displayed so as to be separated in a direction away from each other in a range narrower than the interpupillary distance of the viewer. This can avoid the distance between the left and right corresponding points of the infinite distance subject image from being excessively shorter than the interpupillary distance of the viewer. Also, even in the case of a display having a limited width, an area where the left-eye screen and the right-eye screen are superposed on each other is ensured to be large. Therefore, a large stereoscopic screen with a powerful impression can be obtained.

According to the aspect of the present invention, a left-eye screen and a right-eye screen shot by a stereo camera are displayed as being reduced on a small-sized display of a television, a personal computer, or the like having a width dimension shorter than that of the virtual display. With this, even if the distance between the left and right corresponding points of the infinite distance subject image on the left-eye screen and the right-eye screen tends to be extremely narrower than the interpupillary distance of the viewer, in order to avoid the distance between the left and right corresponding points of the infinite distance subject image from being excessively shorter than the interpupillary distance of the viewer, as with the case in which the left-right distance of the infinite distance subject image is set to be substantially equal to the interpupillary distance of the viewer, a stereoscopic video with a depth equivalent to that in the state where a stereoscopic video on a display having a reference width dimension is being viewed from a recommended viewing distance can be obtained. Also, even compared with the case in which the left-right distance of the infinite distance subject image is set to be substantially equal to the interpupillary distance of the viewer, a large stereoscopic screen with a powerful impression can be obtained.

MODES FOR CARRYING OUT THE INVENTION

To obtain a stereoscopic video with a sense of stereoscopy and a powerful impression even when a left-eye screen and a right-eye screen are displayed on a small-sized display, the present invention provides a stereoscopic video receiver of a binocular stereoscopic type in which a left-eye screen and a right-eye screen shot by a stereo camera are displayed on a display and are viewed by left an right eyes in a separated manner to form a stereoscopic video, wherein the display is formed so as to be narrower in width than a virtual display having a reference width dimension and alternately displays the left-eye screen and the right-eye screen that configure the stereoscopic video in a time-division manner, the left-eye screen has a black non-display portion at a right end in a screen width direction, the right-eye screen has a black non-display portion at a left end in the screen width direction, and with the left-eye screen and the right-eye screen being displayed so as to be displaced in a direction of being separated away from each other, left and right fields of vision are matched with each other at a position away from the display and a distance between left and right corresponding points of an infinite distance subject image is set to be shorter than an interpupillary distance of a viewer.

Figure 1:
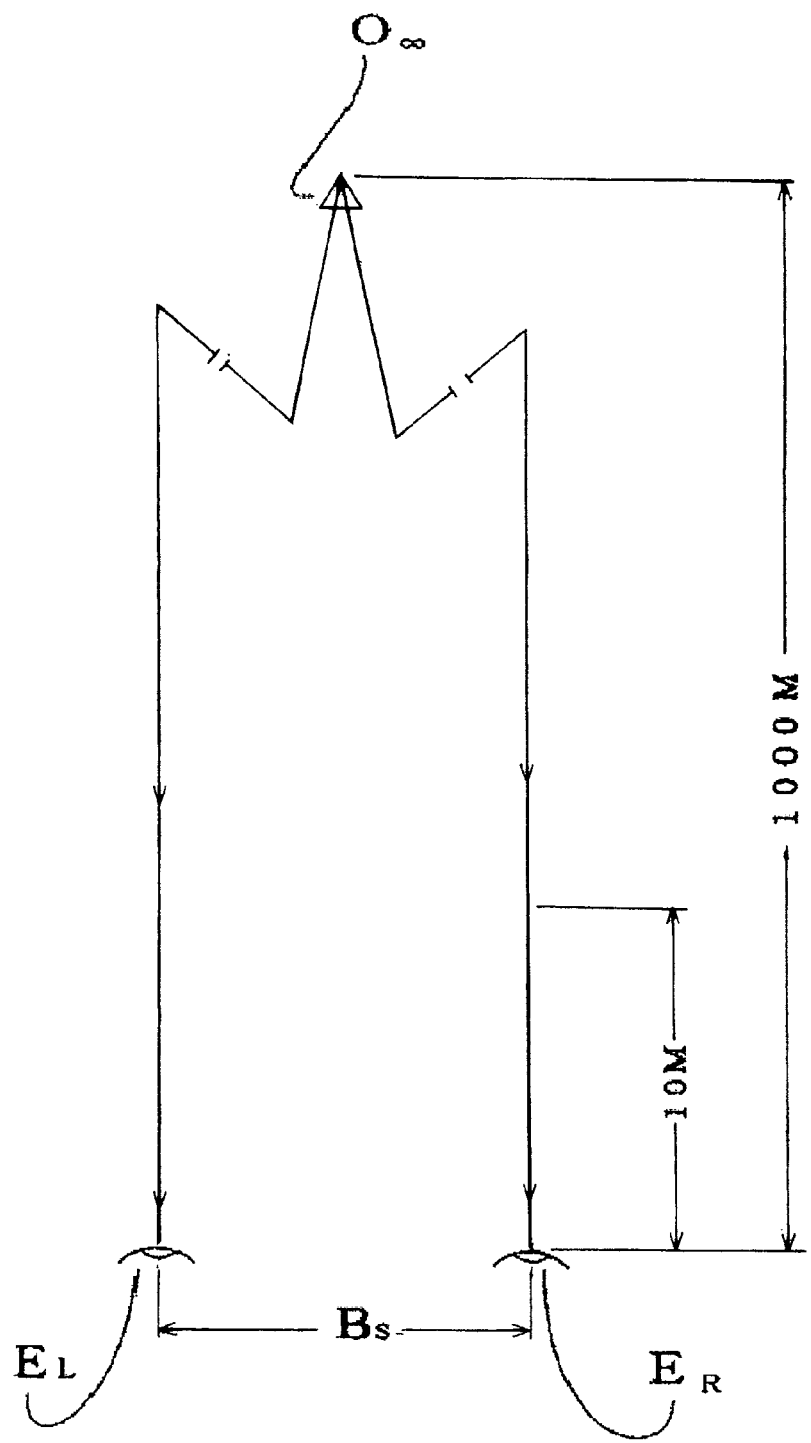
FIG. 1 is a diagram for describing a basic principle of stereoscopy.

Basic principles of stereoscopy are depicted in FIG. 1. First, when a viewer recognizes near and far visions of a subject, light beams launched from an object $O\infty$ positioned at infinity entering a left eye EL and a right eye ER of the viewer are parallel to each other. Light beams launched from the same point of an object positioned at a short distance to enter left and right eyes EL and ER of the viewer are away from each other (the object at the short distance and the light beams emitted from the object are not shown in the drawings). In FIG. 1, when an interpupillary distance BS of the viewer is BS=58 mm and the object distance at infinity is 1000 m (in reality, the distance is a finite distance, but even several tens of meters may be displayed as infinity in photography), the light beams from the same point on the object enter the left and right eyes EL and ER with a distance of 58 mm away from each other. The light beams with a distance of BS=58 mm at a viewpoint position have a distance of 65×(1000−10)/1000=57.42 mm even at a position 10 m closer in a direction of the object, which is not significantly different from the interpupillary distance BS of the viewer. That is, the viewer always views a subject at infinity in a parallel manner.

Figure 2:
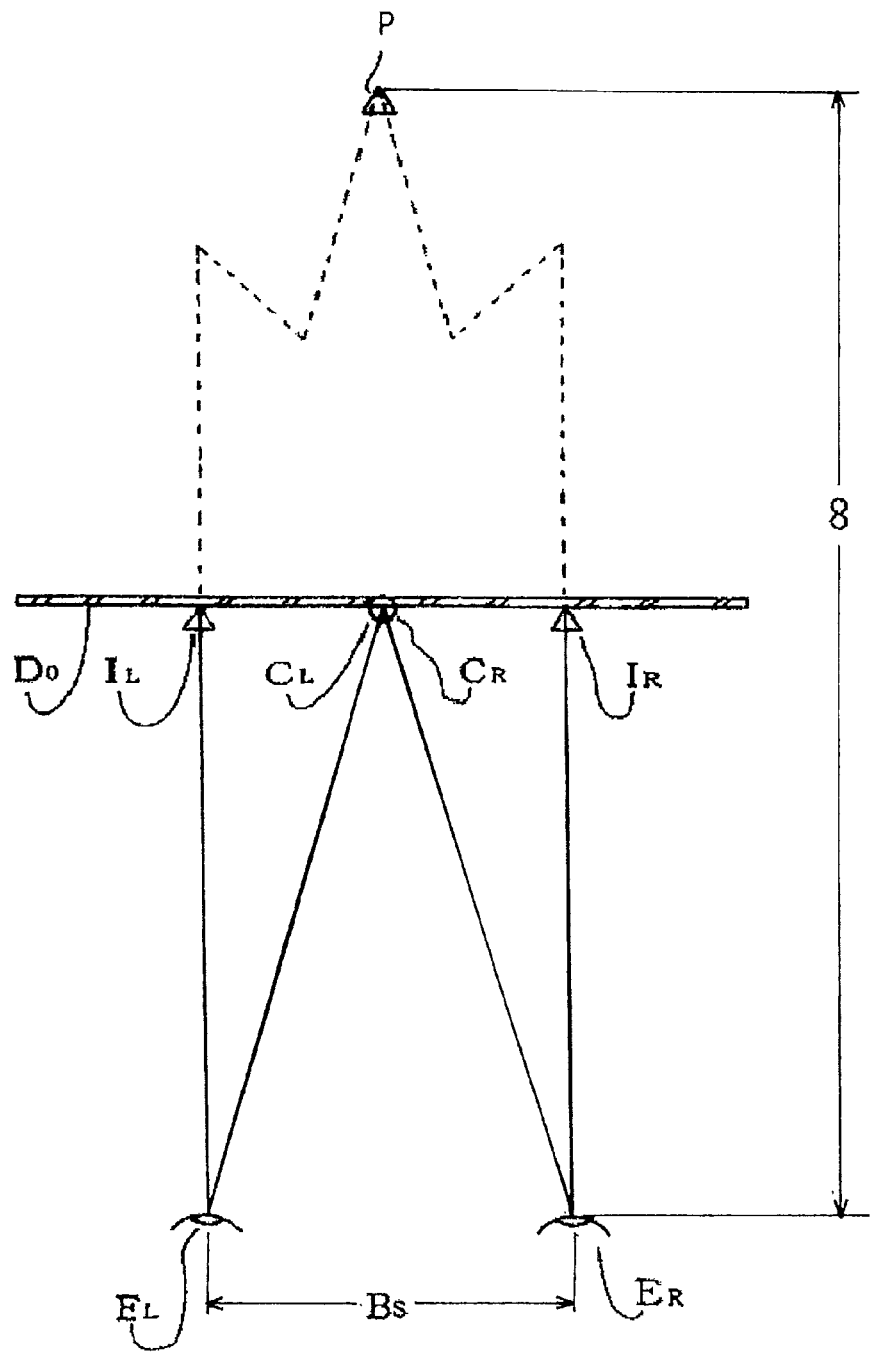
FIG. 2 is a drawing for describing a stereoscopic video receiver for displaying left and right screens so that these screens are superposed at the same position on one display.

Next, as depicted in FIG. 2, when a stereoscopic video is reproduced on the virtual display D0, a left image CL and a right image CR of a subject at a short distance are displayed so as to be superposed on each other. Here, when a distance between a left infinite image IL and a right infinite image IR displayed on the virtual display D0 of an infinite distance subject image P is equal to the interpupillary distance BS, the infinite distance subject image P is formed at infinity, thereby obtaining a stereoscopic video with depth.

However, the left-eye screen and the right-eye screen displayed on a display with a width narrower than that of the virtual display D0 are displayed as being small according to the ratio in width dimension between the display and the virtual display. Therefore, these screens tend to be displayed in a manner such that the distance between the left and right corresponding points of the infinite distance subject image P to be displayed on the display is smaller than the interpupillary distance of the viewer. For this reason, the left-eye screen and the right-eye screen are displayed so as to be displaced in a direction of being separated away from each other to enlarge the distance between the left and right corresponding points of the infinite distance subject image to be displayed on the display D1, thereby increasing the depth of the stereoscopic video.

Figure 3:
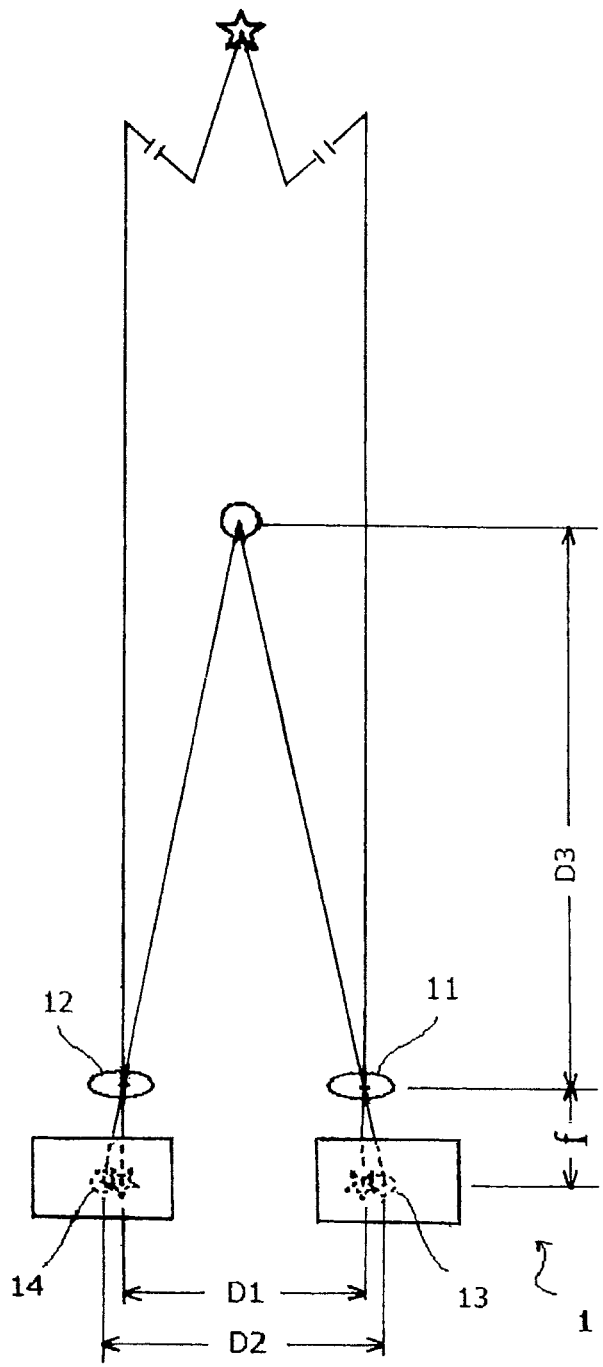
FIG. 3 is a drawing for describing a stereo camera for shooting stereoscopic video.
Figure 4:
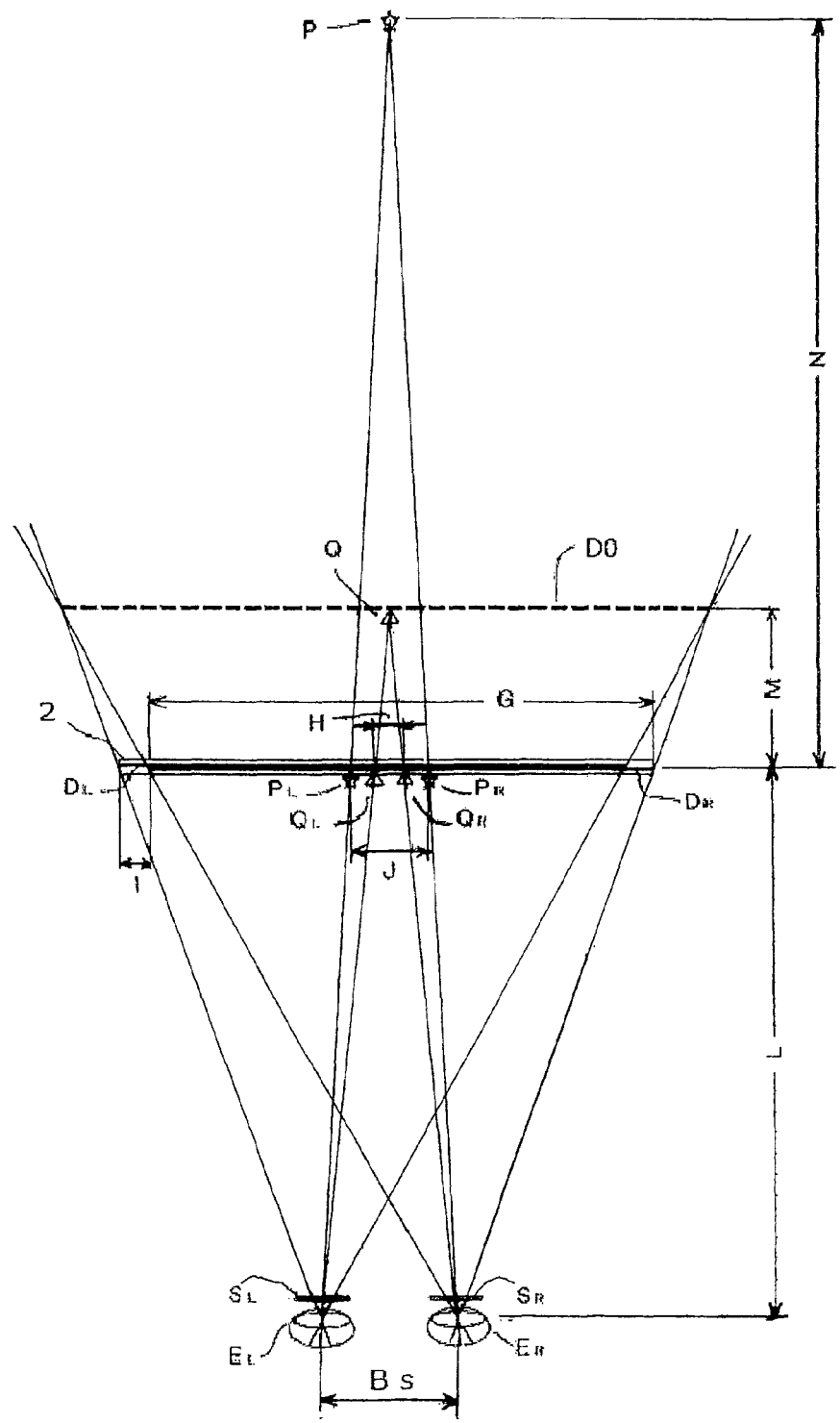
FIG. 4 is a drawing for describing a display for displaying left and right screens.
Figure 5:
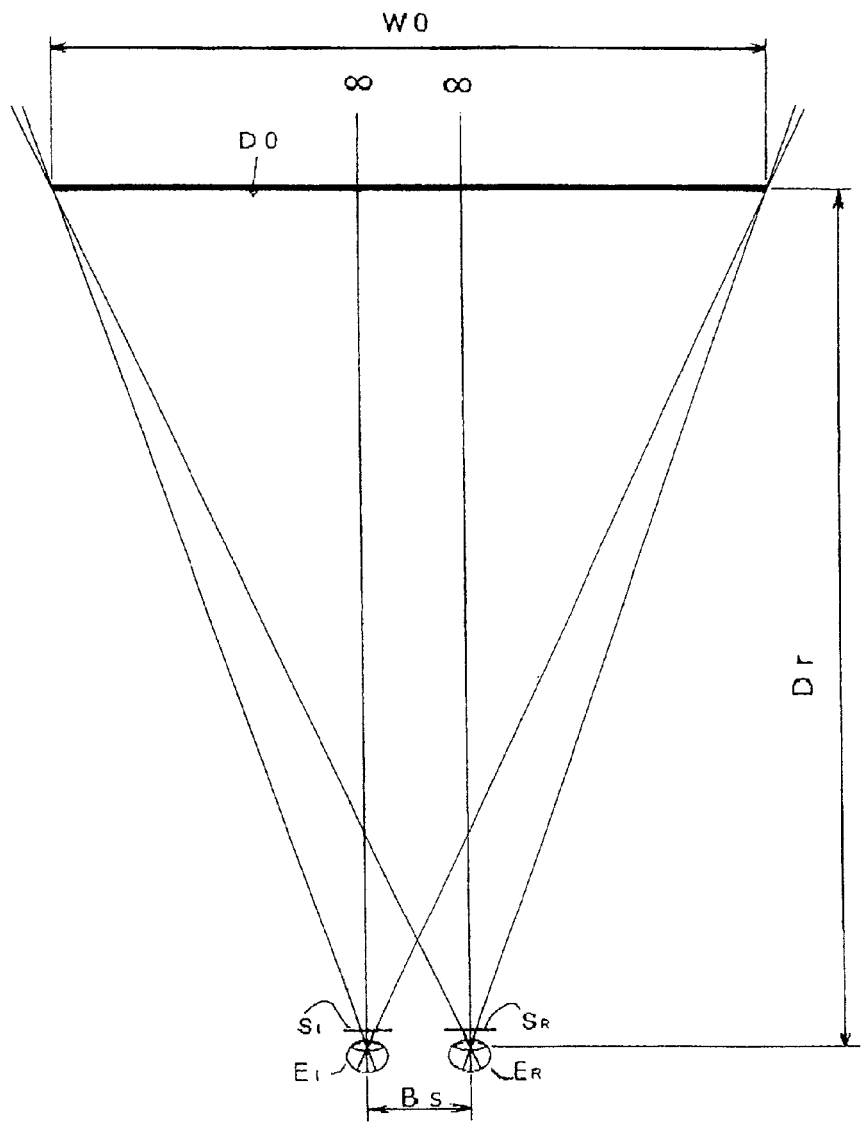
FIG. 5 is a drawing for describing stereoscopy.
Figure 6:
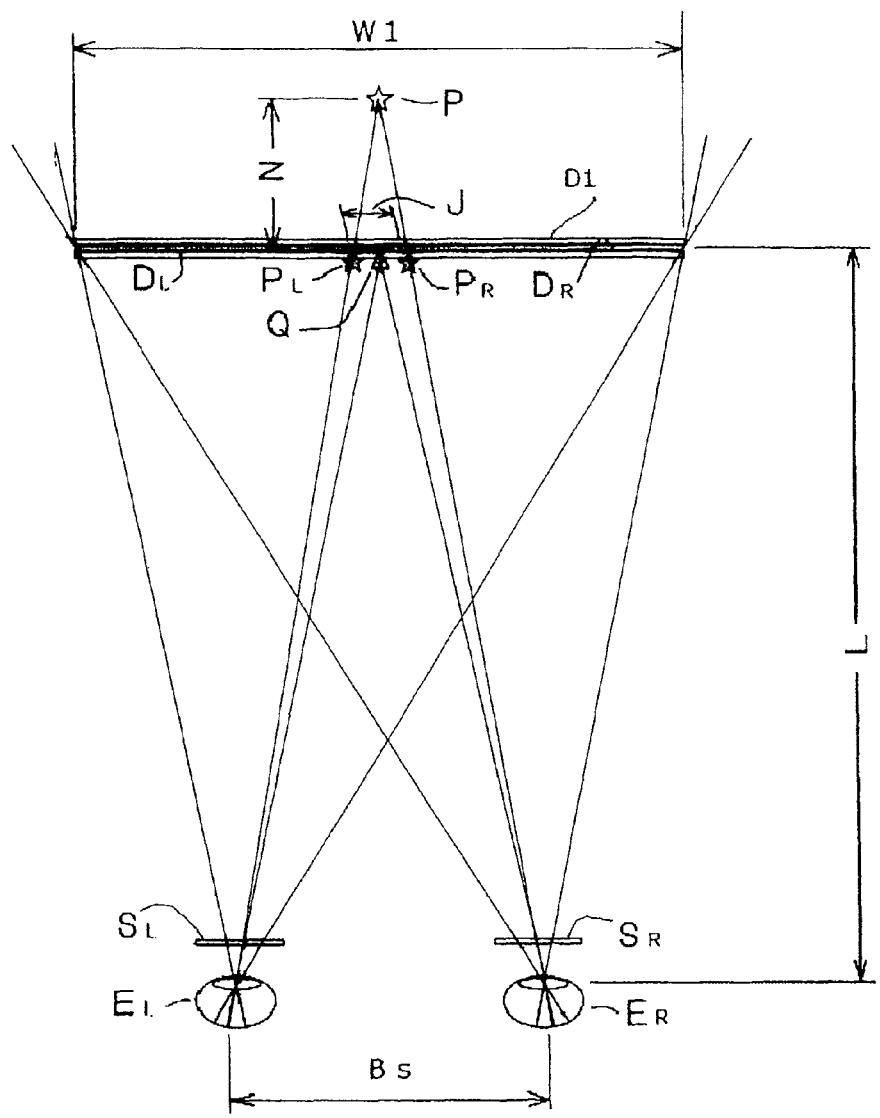
FIG. 6 is a drawing for describing the state in which left and right screens are displayed so as to be superposed on the same display.

Next, the structure of the present invention is described based on FIG. 3 and FIG. 4. The stereoscopic video receiver according to the present invention has a display 2 for displaying, in a time-division manner a left-eye screen and a right-eye screen shot by a stereo camera 1 to configure a stereoscopic video.

As depicted in FIG. 3, the stereo camera 1 described above projects light entering the left and right imaging lenses 11 and 12 onto the left and right imaging elements 13 and 14, respectively to shoot a left-eye screen DL and a right-eye screen DR, which will be described further below. Since light beams from an infinite distance subject entering the left and right imaging lenses 11 and 12 are parallel to each other, the left-right distance of the infinite distance subject image projected onto the left and right imaging elements 13 and 14 is equal to a distance (a lens distance) D1 between the left and right lenses 11 and 12.

When the distance between the left and right imaging lenses 11 and 12 is D1, a distance (a sensor distance) between the left and right imaging elements 13 and 14 is D2, a distance where left and right fields of visions are matched with each other on the imaging elements 13 and 14 is D3, a focal length of the imaging lenses 11 and 12 is f, and a projection ratio of the stereo camera 1 is r, equations of D2=D1+D1·r and r=f/D3 hold. Based on these equations, the left-eye screen DL and the right-eye screen DR projected onto the imaging elements 11 and 12 are alternately displayed in a time-division manner on the display 2, which will be described further below.

Note that in the stereo camera 1 of FIG. 3, the positional relation between the imaging lenses 11 and 12 and the imaging elements 13 and 14 can be a certain relation depicted in the drawing when the subject is positioned away from the distance D3 depicted in the drawing. If an object at a shorter distance enters the field of vision of shooting, an image of this object seems to project from the screen. Also, normally in stereoscopy, left and right picture frames seem to be doubled, which makes the viewer feel stress. Therefore, objects nearer than the recommended viewing distance should not be in the field of vision.

The display 2 depicted in FIG. 4 is, for example, a display of a personal computer, displaying the left-eye screen DL and the right-eye screen DR to be viewed separately with the left and right eyes of the viewer through eyeglasses for separated fields of vision.

The display 2 according to the present embodiment adopts a size of 15.5 inches, and its width dimension is 345 mm, which is narrower than a reference width dimension of the virtual display D0 of 1800 mm. Note that while the width dimension of the display 2 is 345 mm in the present embodiment, any size can suffice as long as the width dimension is narrower than the reference width dimension of the virtual display D0.

Also, the left-eye screen DL shot by the left imaging element 14 included in the stereo camera 1 has a black non-display portion in an area 40 mm from a right end in a screen width direction, and the right-eye screen DR in the right imaging element 13 has a black non-display portion in an area 40 mm from a left end in the screen width direction. Furthermore, the left-eye screen DL and the right-eye screen DR are displayed so as to be displaced as being each shifted by 20 mm in a direction of being separated away from each other. Therefore, a image width G of each of the left-eye screen DL and the right-eye screen DR is 305 mm.

Next, a depth M of a near-point stereoscopic image Q with fields of visions seeming to be matched with each other is described. A distance H between corresponding positions QL-QR of the near-point image Q on the display 2 in FIG. 4 is superposed at the same positions of the left-eye screen DL and the right-eye screen DR before displacement display. Therefore, a shift amount I of each of the left-eye screen DL and the right-eye screen DR is I=40 mm.

When the virtual display D0 with reference width dimension of 1800 mm is viewed 2500 mm away from the virtual display D0, the width dimension of each of the left-eye screen DL and the right-eye screen DR is 304 mm, the observation distance L in FIG. 4 is 2500/(1800/305)=424 mm. Therefore, the depth M of the near-point image Q is 424/(58/40−1)=942 mm. That is, the left and right fields of vision can be matched with each other at a position 842 mm away from the display.

Next, a depth N of the infinite distance subject image P is described. When the left-right distance of the infinite distance subject image on the virtual display D0 having a reference width dimension of 1800 mm is 58 mm, the distance between corresponding points PL and PR of the infinite distance subject image P on the left-eye screen DL and the right-eye screen DR is 305/(180/58)≈9.83 mm.

Since the left-eye screen DL and the right-eye screen DR are each shifted by 20 mm in a direction of being separated away from each other, that is, the right-eye screen DR is shifted by a shift amount I (40 mm) with respect to the left-eye screen DL, a distance J between the corresponding points PL and PR of the infinite distance subject image P on the left-eye screen DL and the right-eye screen DR is I+9.83 mm=49.83 mm, which is shorter than the interpupillary distance BS (58 mm) of the viewer. Here, the depth N of the infinite distance subject image P is 424/((58/49.83)−1)=2586 mm. This value of the depth N of the infinite distance subject image P is a significantly large value compared with the case of displaying on a display with a size of 15.5 inches in the conventional method. Therefore, this is effective even if the shift amount I is subtle. If the receiver is used only for the purpose of viewing, even a screen shift amount of 1 mm is effective.

As described above, the left-eye screen DL and the right-eye screen DR shot by the stereo camera 1 are displayed as being reduced on a display 2 of a television, a personal computer, or the like having a width dimension shorter than that of the virtual display D0. With this, even if the distance J between the left and right corresponding points PL and PR of the infinite distance subject image P on the left-eye screen DL and the right-eye screen DR tends to be extremely narrower than the interpupillary distance BS of the viewer, as with the case in which the distance J between the left and right corresponding points PL and PR of the infinite distance subject image P is set to be substantially equal to the interpupillary distance BS of the viewer, a stereoscopic video with a depth equivalent to that in the state where a stereoscopic video on the display D0 having the reference width dimension is being viewed from the recommended viewing distance can be obtained. Also, even compared with the case in which the distance J between the left and right corresponding points PL and PR of the infinite distance subject image P is set to be substantially equal to the interpupillary distance BS of the viewer, a large stereoscopic screen with a powerful impression can be obtained.

Note that the present invention can be variously modified as long as the modifications do not deviate from the spirit of the present invention and, as a matter of course, the present invention covers these modifications.

The present invention can be applied to various stereoscopic type other than a type of separated fields of vision in which left and right fields of vision are separated by using eyeglasses for separated fields of vision.

The invention claimed is:

1. A stereoscopic video receiver of a binocular stereoscopic type in which a left-eye screen and a right-eye screen shot by a stereo camera are displayed on a display and are viewed by left and right eyes in a separated manner to form a stereoscopic video, wherein the display is formed so as to be narrower in width than a virtual display having a reference width dimension, and alternately displays the left-eye screen and the right-eye screen that configure the stereoscopic video in a time-division manner, the left-eye screen has a black non-display portion at a right end in a screen width direction, the right-eye screen has a black non-display portion at a left end in the screen width direction, and with the left-eye screen and the right-eye screen being displayed so as to be displaced in a direction of being separated away from each other, left and right fields of vision are matched with each other at a position away from the display and a distance between left and right corresponding points of an infinite distance subject image is set to be shorter than an interpupillary distance of a viewer.

2. A stereoscopic video receiver for displaying an image on a display having an image width less than a virtual display image width for providing a stereoscopic video image having improved perception of depth for a viewer having an interpupillary distance comprising:
- a left eye display portion on the display, said left eye display portion capable of displaying a left eye video image of the stereoscopic video image alternately in time;
- a right eye display portion on the display, said right eye display portion capable of displaying a right eye video image of the stereoscopic video image alternately in time;
- a left eye black non-display portion formed along a width of the display at a right end of the left eye display portion;
- a right eye black non-display portion formed along a width of the display at a left end of the right eye display portion; and
- wherein the right eye video image and the left eye video image are displaced away from each other so that a distance between left and right corresponding points of an image of a subject at an infinite distance is less than the interpupillary distance of the viewer when left and right fields of vision of the viewer are matched with each other at a position of the viewer away from the display,
- whereby the perception of depth by the viewer of the stereoscopic video image is enhanced.

3. A method of displaying a stereoscopic video image with a stereoscopic video receiver on a display having an image width less than a virtual display image width for providing a stereoscopic video image having improved perception of depth for a viewer having an interpupillary distance comprising the steps of:
- forming a left eye image of the stereoscopic video image on a left portion of the display alternately in time;
- forming a right eye image of the stereoscopic video image on a right portion of the display alternately in time;
- providing a black non-display portion along a width of the display at a right end of the left eye image;
- providing a black non-display portion along a width of the display at a left end of the right eye image; and
- displacing the right eye image and the left eye image away from each other so that a distance between left and right corresponding points of an image of a subject at an infinite distance is less than an interpupillary distance of a viewer when left and right fields of vision of the viewer are matched with each other at a position of the viewer away from the display,
- whereby the perception of depth in a stereoscopic video image is enhanced.

* * * * *